(12) United States Patent
Krönung

(10) Patent No.: US 9,239,127 B2
(45) Date of Patent: Jan. 19, 2016

(54) ADJUSTABLE STOP MECHANISM FOR ROTATABLE CONNECTION AND A ROTATABLE JOINT COMPRISING THE SAME

(75) Inventor: Karl Krönung, Hofbieber (DE)

(73) Assignee: Ondal Medical Systems GmbH, Hunfeld (DE)

( * ) Notice: Subject to any disclaimer, the term of this patent is extended or adjusted under 35 U.S.C. 154(b) by 234 days.

(21) Appl. No.: 13/510,893

(22) PCT Filed: Sep. 23, 2010

(86) PCT No.: PCT/EP2010/005831
§ 371 (c)(1),
(2), (4) Date: May 18, 2012

(87) PCT Pub. No.: WO2011/060846
PCT Pub. Date: May 26, 2011

(65) Prior Publication Data
US 2012/0228454 A1    Sep. 13, 2012

(30) Foreign Application Priority Data

Nov. 18, 2009 (EP) .................................. 09014411

(51) Int. Cl.
*F16M 11/00* (2006.01)
*F16M 11/06* (2006.01)
*F16C 11/10* (2006.01)

(52) U.S. Cl.
CPC .............. *F16M 11/06* (2013.01); *F16C 11/10* (2013.01); *F16M 2200/024* (2013.01); *Y10T 403/32975* (2015.01)

(58) Field of Classification Search
USPC ............ 248/288.11, 418, 274.1, 231.41, 417, 248/288.51, 296.1, 416, 125.1, 125.3; 403/164
See application file for complete search history.

(56) References Cited

U.S. PATENT DOCUMENTS

| | | | |
|---|---|---|---|
| 1,634,922 A | | 7/1927 | Stubblebine et al. |
| 3,133,743 A | * | 5/1964 | Mullin ..................... 280/93.508 |
| 3,713,618 A | | 1/1973 | Hendrickson et al. |
| 4,303,135 A | * | 12/1981 | Benoit ............................ 175/73 |
| 4,587,908 A | * | 5/1986 | DeBruyn ....................... 108/142 |
| 4,673,154 A | * | 6/1987 | Karapita ....................... 248/320 |
| 4,772,246 A | * | 9/1988 | Wenzel ......................... 464/117 |

(Continued)

FOREIGN PATENT DOCUMENTS

DE        38 08 327 A1    9/1988

*Primary Examiner* — Monica Millner
(74) *Attorney, Agent, or Firm* — Seed IP Law Group PLLC

(57) ABSTRACT

The present invention provides a rotatable joint (1) comprising: a first joint member (10) for connection to a reference frame; a second joint member (20) connected with the first joint member (10) and configured for rotation relative to the first joint member (10) about an axis (13); and an adjustable stop mechanism (30) for defining limits of rotation of the second joint member (20) relative to the first joint member (10). The adjustable stop mechanism (30) comprises: a first part (40) provided on the first joint member (10) having at least a first stop (41) defining at least a first limit of rotation of the second joint member (20) about said axis (13) relative to the first joint member (10), wherein the first part (40) is adapted to be selectively positioned with respect to the first joint member (10) to set or define a limit or range of rotation of the second joint member (20) relative to the first joint member (10).

16 Claims, 3 Drawing Sheets

(56) References Cited

U.S. PATENT DOCUMENTS

| | | | |
|---|---|---|---|
| 4,938,094 A * | 7/1990 | Cochard | 74/552 |
| 5,685,661 A * | 11/1997 | Marka et al. | 403/166 |
| 5,720,570 A * | 2/1998 | Cole et al. | 403/256 |
| 6,030,103 A * | 2/2000 | Gampe et al. | 362/404 |
| 6,226,068 B1 * | 5/2001 | Arcykiewicz et al. | 439/314 |
| 6,234,259 B1 * | 5/2001 | Kuckes et al. | 175/73 |
| 6,633,328 B1 * | 10/2003 | Byrd et al. | 348/143 |
| 6,698,704 B2 * | 3/2004 | Kuhn | 248/343 |
| 6,817,585 B2 * | 11/2004 | Wagner et al. | 248/324 |
| 6,866,410 B2 * | 3/2005 | Jesurun et al. | 362/572 |
| 6,899,442 B2 * | 5/2005 | Howell et al. | 362/147 |
| 7,216,726 B2 * | 5/2007 | Swietlik et al. | 175/73 |
| 7,455,328 B2 * | 11/2008 | Chelchowski et al. | 285/323 |
| 7,559,518 B2 * | 7/2009 | Ye | 248/288.11 |
| 7,591,446 B2 * | 9/2009 | Istas et al. | 248/288.11 |
| 7,635,234 B2 * | 12/2009 | Schindler et al. | 403/192 |
| 7,726,823 B2 * | 6/2010 | Rus et al. | 362/33 |
| 7,753,330 B2 * | 7/2010 | Brief | 248/278.1 |
| 7,938,205 B2 * | 5/2011 | Puttmann | 175/389 |
| 8,070,331 B2 * | 12/2011 | Gull et al. | 362/389 |
| 8,197,154 B2 * | 6/2012 | Broering et al. | 403/165 |
| 8,262,311 B2 * | 9/2012 | Trice | 403/349 |
| 8,424,833 B2 * | 4/2013 | Muller et al. | 248/639 |
| 2005/0006542 A1 | 1/2005 | Henning et al. | |
| 2005/0242261 A1 * | 11/2005 | Brahler et al. | 248/326 |
| 2009/0072106 A1 | 3/2009 | Zheng | |
| 2009/0245924 A1 * | 10/2009 | Whitling et al. | 403/13 |

* cited by examiner

ADJUSTABLE STOP MECHANISM FOR ROTATABLE CONNECTION AND A ROTATABLE JOINT COMPRISING THE SAME

TECHNICAL FIELD

The present invention relates to an adjustable stop mechanism for a rotatable connection or a pivot connection. More particularly, the adjustable stop mechanism is preferably designed for use in a swivel or pivot joint of a mounting arm, such as the type used for supporting technical equipment, e.g. in hospitals and in industrial environments. Thus, the present invention also relates to a swivel or pivot joint, such as a pivot joint of a mounting arm, incorporating such a stop mechanism.

With the stop mechanism of the present invention, the limits or end-points of the rotation or pivot in the connection or joint can be adjusted and/or set to provide a consistent and reliable definition of the range of rotational movement available in the mounting arm. In this way, the swivel or pivot joint of the mounting arm can be variably adjusted or set to suit the specific requirements of the room or space in which the technical equipment is to be installed, and/or to suit the requirements of the equipment itself mounted on the arm. It will be convenient to hereafter describe the invention in this particular context. It is to be noted, however, that the adjustable stop mechanism of the invention is not limited to use in a swivel or pivotable joint of a mounting arm.

BACKGROUND OF THE INVENTION

The provision of one or more stops in a rotatable connection or a pivot connection for limiting or defining a range of rotational movement available in a support arm or mounting arm or other structure is known in the art. Conventionally, however, such stops are fixed and do not enable the user to adjust or modify the range of movement depending upon the particular spatial parameters available for the installation of the rotatable connection and/or depending upon the technical field of application. Thus, the present invention is directed to the problem of providing a new and improved stop mechanism for a rotatable joint, with which a user may readily adjust and/or set a range of rotational movement in the joint.

SUMMARY OF THE INVENTION

According to one aspect, the present invention provides an adjustable stop mechanism for a rotatable connection or joint, such as a pivot joint or a swivel joint, where the joint comprises a first joint member and a second joint member, the second joint member being connected with the first joint member and rotatable relative thereto about an axis. The stop mechanism comprises: a first part to be provided on the first joint member and having at least a first stop which defines at least a first limit of relative rotation of the second joint member. The first part of the stop mechanism, and thus the first stop, is adapted to be selectively positioned with respect to the first joint member to set or to define a range of rotation of the second joint member relative to the first joint member.

In a preferred embodiment of the invention, the first joint member is configured as a shaft or column around which the second joint member is configured to rotate or pivot. As such, the second joint member preferably comprises a sleeve or collar component which extends around the first joint member. The stop mechanism of the invention is preferably arranged between the first joint member and the second joint member, and more particularly, is preferably located between the shaft or column of the first joint member and the sleeve or collar of the second joint member.

In a preferred embodiment of the invention, the adjustable stop mechanism further comprises a second part to be provided on the first joint member having a second stop defining a second limit of relative rotation of the second joint member. More particularly, the second part is preferably provided or arranged on the first part. The first and second parts of the stop mechanism are adapted to be selectively positioned with respect to the first joint member, and with respect to one another, to define or set a range of rotation of the second joint member relative to the first joint member between the first stop and the second stop.

In a preferred form of the invention, the first stop comprises an abutment member which is configured to be located in a path of the second joint member to block or prevent rotation of the second joint member relative to the first joint member. Furthermore, the second stop preferably comprises an abutment member which is configured to be located in the path of the second joint member to block or prevent rotation of the second joint member relative to the first joint member.

In a preferred form of the invention, the first part of the adjustable stop mechanism is configured to be selectively positioned to locate and set the first stop with respect to the first joint member. In this way, a user can position the first stop at a desired location with respect to the first joint member in order to define or set at least a first limit of rotation of the second joint member, i.e. at an end of the path of rotation. The first part of the stop mechanism is preferably adapted to be selectively moved and positioned around the axis, and more preferably a circumference or periphery of the first joint member. For this purpose, the first part of the stop mechanism preferably includes means for registered interconnection with the first joint member to fix the first stop against rotation about said axis relative to the first joint member at different positions. The means for registered interconnection may, for example, comprise a first detent mechanism with one or more recesses or projections formed in or on the first part of the stop mechanism for corresponding receipt of, or engagement with, one or more complementary projections or recesses formed on or in the first joint member. In an especially preferred embodiment, a plurality of such recesses or projections are provided spaced apart from one another at intervals, e.g. regular intervals, around a circumference or periphery of the first part of the stop mechanism and/or of the first joint member. Preferably, the first part of the stop mechanism is ring-shaped or formed as a sleeve to be mounted on the first joint member.

Notably, if the stop mechanism includes only a single stop (e.g. only a first stop on the first part), that stop may nevertheless define or provide two limits to the relative rotation of the second joint member at opposite ends of the path of rotation. That is, the abutment member of the first stop may present opposite abutment surfaces, which each abutment surface forming a respective end of the rotation path. It is also conceivable that two stops could be provided on the first part for defining the range of the relative rotation of the second joint member there-between. As noted above, however, in preferred embodiments the stop mechanism of the invention includes a second part having a second stop, and defines a range of rotation of the second joint member relative to the first joint member between the first stop and the second stop.

In a preferred embodiment of the invention, the second part of the stop mechanism is configured to be selectively positioned to locate the second stop with respect to the first stop. The first and second parts of the stop mechanism are thus configured to be independently positioned with respect to the first joint member. The second part is preferably designed to be provided on the first part, and may therefore be selectively positioned with respect to the first part. In this way, a user can begin by positioning the first part, and thus the first stop, at a desired location with respect to the first joint member in order to define or set the first limit of rotation of the second joint member (i.e. at one end of the path of rotation). The user can then position the second part, and thus the second stop, relative to the first part/stop to set or define the second limit of rotation of the second joint member (i.e. at the other end of the path of rotation). This provides the user with the flexibility to adjust and to adapt the stop mechanism to suit the environment in which the rotatable joint, e.g. pivot joint or swivel joint, is employed.

In a preferred embodiment of the invention, the second part of the stop mechanism is adapted to be selectively moved and positioned around a circumference or a periphery of the first joint member. As such, the stop mechanism includes means for registered positioning of the second part on the first part to fix the second stop against rotation about said axis relative to the first part at any of a plurality of positions. The means for registered positioning of the second part thus preferably comprises a second detent mechanism with a plurality of recesses or projections formed in the first part for corresponding receipt of, or engagement with, a registration member of the second part.

According to another aspect, the present invention provides a rotatable joint, such as a pivot joint or a swivel joint for a mounting arm, which incorporates the adjustable stop mechanism of the invention. In this aspect, the joint comprises: a first joint member for connection to a reference frame; a second joint member connected with the first joint member and configured for rotation relative to the first joint member about a rotational axis; and an adjustable stop mechanism for defining the limits of rotation of the second joint member relative to the first joint member. The reference frame to which the first joint member is connected will typically be a stationary reference frame, such as a wall or ceiling of a building. It will be noted, however, that the present invention applies equally to a situation where the reference frame is non-stationary or mobile, as may be the case where the joint is incorporated in an articulated mechanism, on a piece of machinery, or in a vehicle. As noted above, the first joint member may be configured as a shaft or column and the second joint member may be configured as a sleeve or collar component that extends around and pivots about the first joint member.

As already discussed above, the adjustable stop mechanism comprises: a first part which is provided on the first joint member and has a first stop defining at least a first limit of rotation of the second joint member relative to the first joint member. The first part is adapted to be selectively and independently positioned with respect to the first joint member to set a range of rotation of the second joint member relative to the first joint member. The stop mechanism of the invention is preferably arranged between the first joint member and the second joint member, e.g. between the shaft or column of the first joint member and the sleeve or collar of the second joint member.

In a preferred embodiment of the invention, the stop mechanism further comprises a second part which is provided on the first joint member and/or on the first part, and has a second stop for defining a second limit of rotation of the second joint member relative to the first joint member. In this regard, the first part and the second part are adapted to be selectively and independently positioned with respect to the first joint member, and with respect to each other, to set or to define a range of rotation of the second joint member relative to the first joint member between the first stop and the second stop.

In a preferred embodiment of the invention, the second joint member comprises an engagement member, which travels a path between the stops during rotation of the second joint member relative to the first joint member and which engages or comes into abutment with a respective one of the stops at each limit of the relative rotation.

In a preferred embodiment of the invention, the second joint member is connected substantially coaxially with the first joint member, and the engagement member projects radially from the second joint member, preferably radially inwardly, to engage or come into abutment with each of the first and second stops at the limits of its rotation relative to the first joint member.

According to a further aspect, the present invention provides a mounting arm for supporting technical equipment, such as in a hospital or in a commercial or in an industrial environment. The mounting arm of the invention incorporates a rotatable joint according to the invention, as described above.

BRIEF DESCRIPTION OF THE DRAWINGS

The above and further features and advantages of the invention will become more readily apparent from the following detailed description of preferred embodiments of the invention with reference to the accompanying drawings, in which like reference characters identify like features, and in which.

DETAILED DESCRIPTION OF THE PREFERRED EMBODIMENTS

Figure 1:
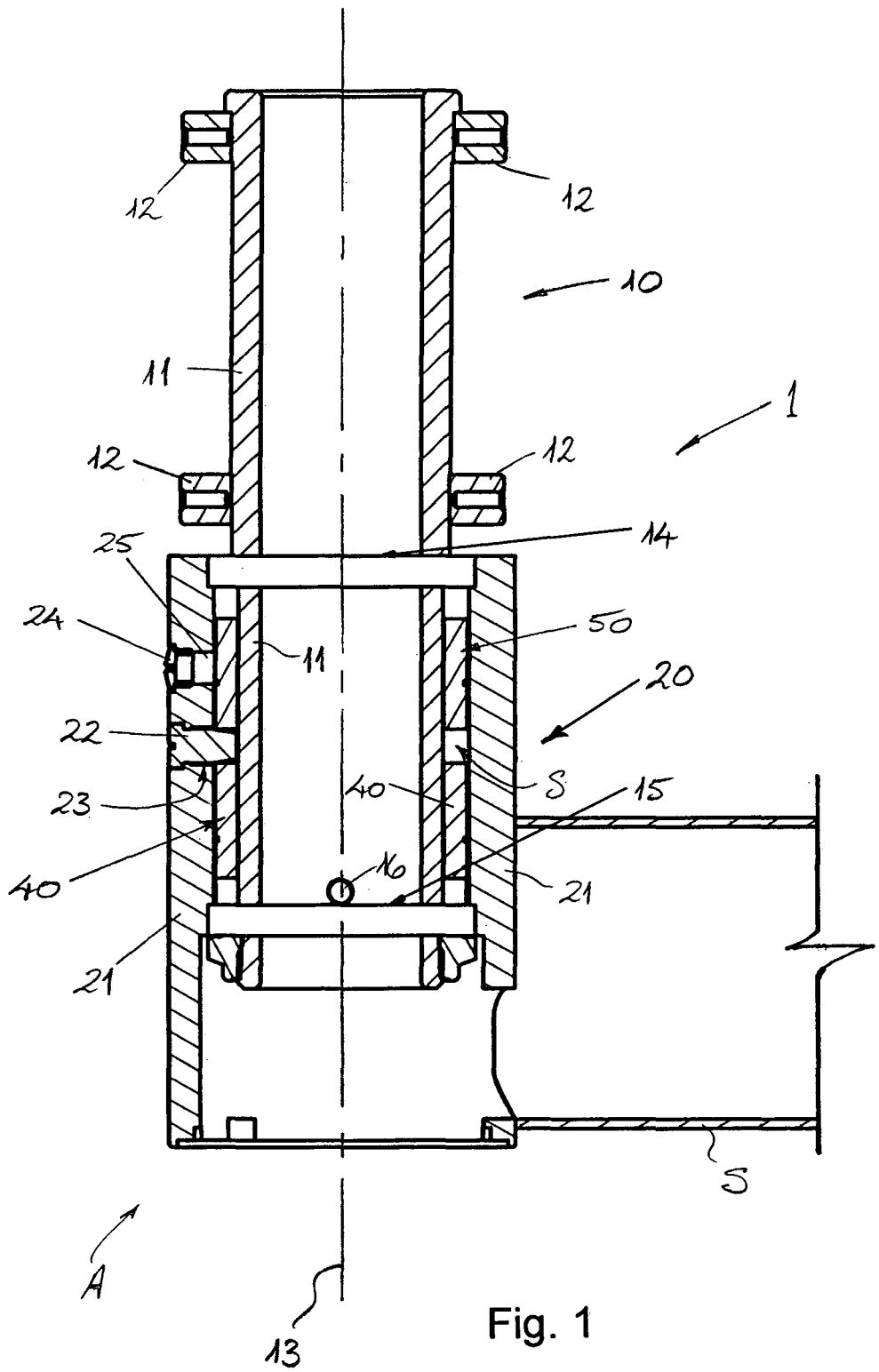
FIG. 1 is a sectioned side view of a rotatable joint in a mounting arm according to a preferred embodiment of the invention.

Referring to FIG. 1 of the drawings, a mounting arm A with a rotatable connection 1 according to a preferred embodiment of the invention is illustrated in a sectioned side view. The mounting arm A includes a support member S (partly shown in FIG. 1) which extends horizontally from the rotatable connection 1 to a distal end (not shown) designed to support technical equipment, such as lighting, one or more computer display screen, and/or any of a variety of medical or industrial equipment for use in a corresponding environment (e.g. hospital, medical practice, factory etc.).

The rotatable connection 1 according to this embodiment of the invention is in the form of a pivot joint or swivel joint in the mounting arm A. The rotatable joint 1 comprises a first joint member 10 in the form of a substantially vertically extending cylindrical shaft or column 11, which is designed to be rigidly secured to a structure, such as a ceiling of a building, via mounting flanges 12. The ceiling of the building thus forms a static reference frame for the joint 1. Furthermore, the rotatable joint 1 comprises a second joint member 20 in the form of a generally cylindrical sleeve 21 which is mounted on a lower end of the first joint member 10 and extends around the shaft 11. More particularly, the second joint member 20 is connected to the first joint member 10 for rotation relative to the first joint member about a central axis 13 of the shaft 11. That is, as can be seen in FIG. 1, the sleeve 21 is mounted on upper and lower bearings 14, 15 (e.g. roller bearings) for rotary movement relative to the shaft 11 about the central axis 13.

According to the invention, the limits and/or the range of rotational movement of the sleeve 21 (and, thus, of the support member S which is rigidly connected to the sleeve 21) relative to the shaft 11 is able to be adjusted and set with an adjustable stop mechanism 30 located between the first and second joint members 10, 20. Details of the stop mechanism 30 will be more apparent from FIGS. 2 and 3 of the drawings, in which the pivot joint 1 is illustrated in perspective side views without the sleeve 21 of the second joint member 20. In other words, the parts of the adjustable stop mechanism 30 are clearly visible mounted around the cylindrical shaft 11 when the sleeve 21 of the second joint member 20 is removed.

The stop mechanism 30 comprises a first part 40 in the form of a generally ring-shaped first collar which extends around the outer periphery of the shaft 11 of the first joint member 10. The inner diameter of the first part or first collar 40 is slightly larger than the outer diameter of the shaft 11 to provide a small amount of play that enables the collar 40 to be moved freely or independently relative to the shaft 11. The collar 40 includes a first stop 41 in the form of a rectangular abutment member which is integral with and extends upwardly from an upper edge region of the first collar 40. As will be described in more detail later, the first stop 41 is designed to block or prevent rotation of the second joint member 20 relative to the first joint member 10. The stop mechanism 30 also comprises a second part 50 in the form of another generally ring-shaped collar which also extends around the outer periphery of the shaft 11 above the first collar 40. Again, the inner diameter of the second part or second collar 50 is slightly larger than the outer diameter of shaft 11 so that this collar 50 is freely movable relative to the shaft. The second collar 50 includes a second stop 51 in the form of a rectangular abutment member which is integral with and extends downwardly from a lower edge region of that second collar 50 towards the first collar 40. This second stop 51 is also designed to block or prevent rotation of the second joint member 20 relative to the first joint member 10.

Figure 2:
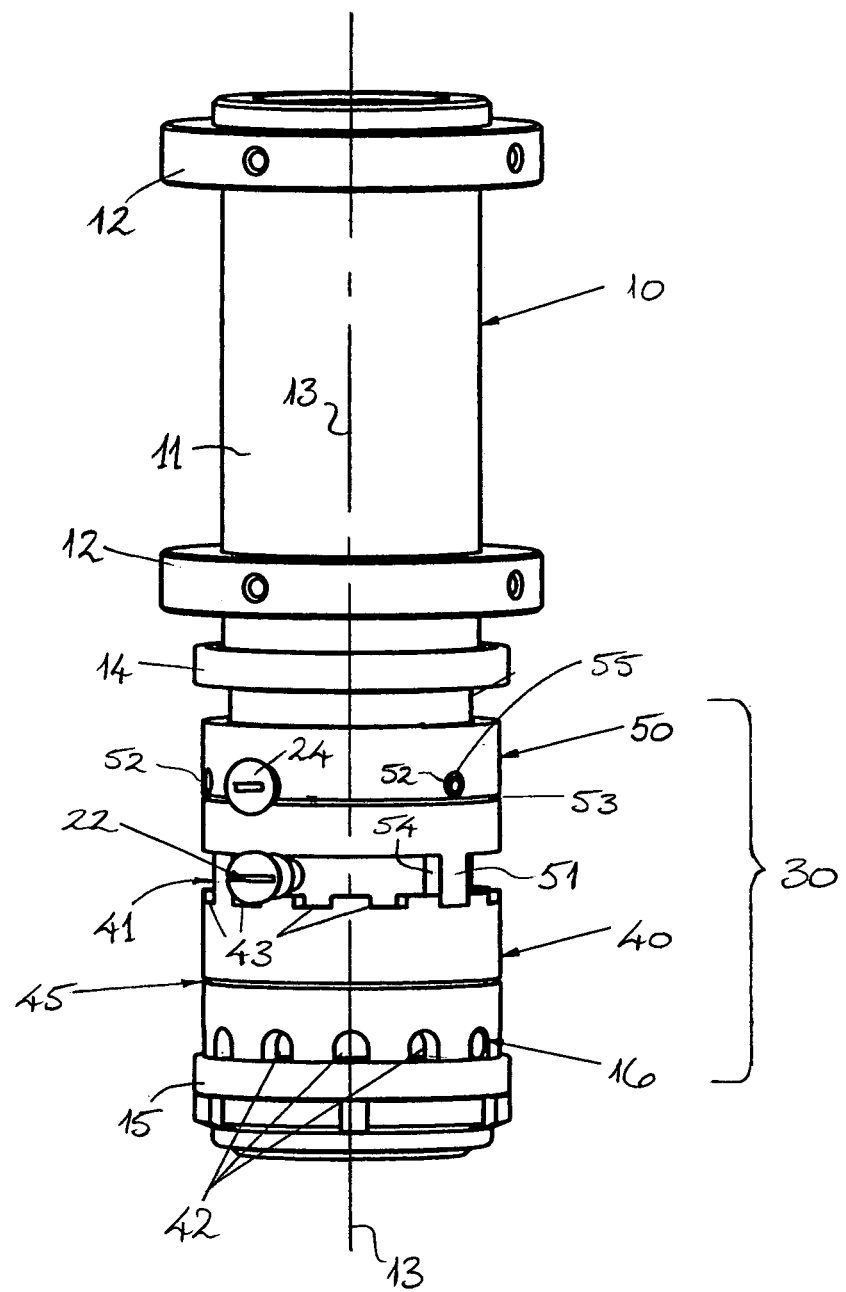
FIG. 2 is a perspective side view of part of the rotatable joint of FIG. 1 showing the adjustable stop mechanism according to a preferred embodiment of the invention, with the first and second stops set in particular positions.
Figure 3:
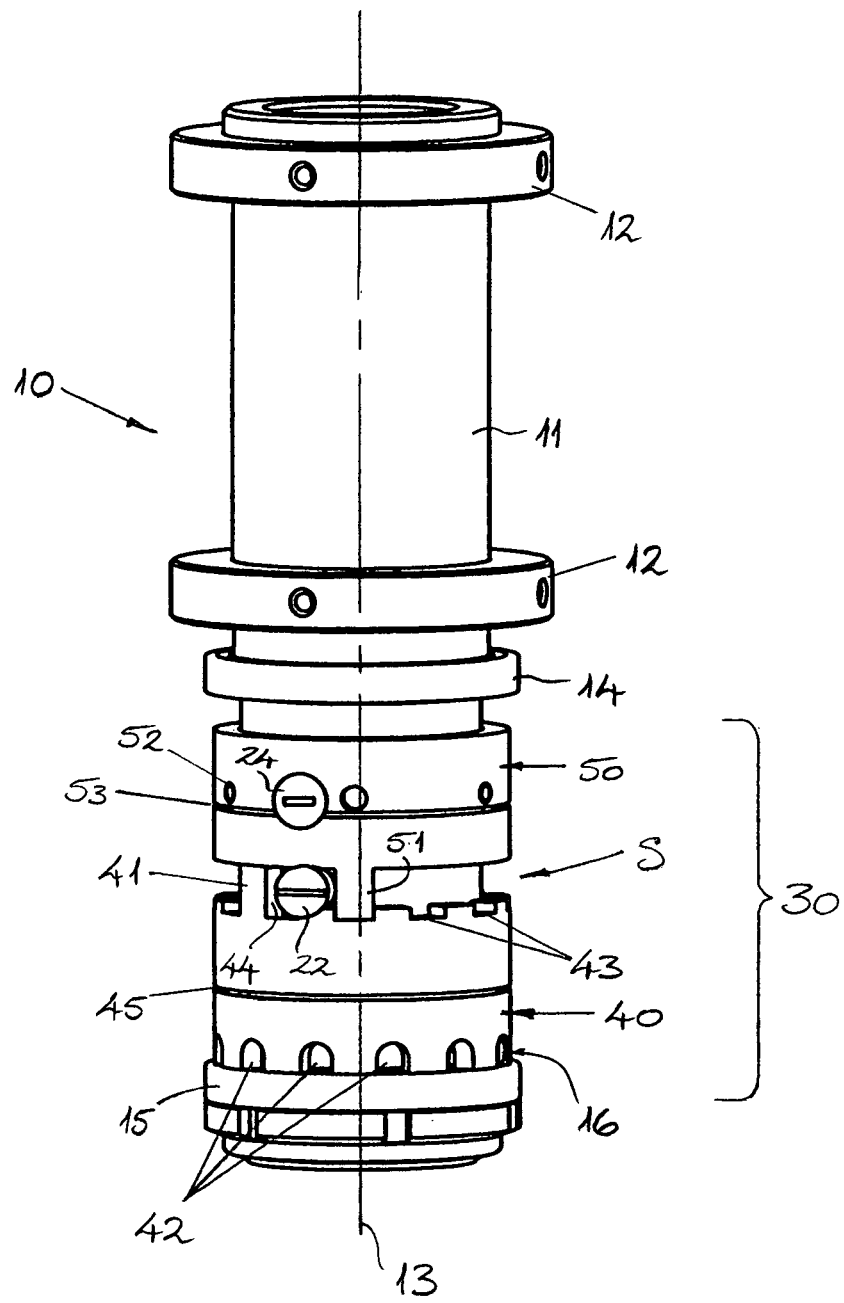
FIG. 3 is a perspective side view of part of the rotatable joint of FIG. 1, showing the adjustable stop mechanism according to a preferred embodiment of the invention having the first and second stops set in different positions to those shown in FIG. 2.

With further reference now to FIGS. 2 and 3 of the drawings, the first collar 40 of the stop mechanism 30 in this embodiment sits or rests against an upper surface of the lower bearing 15 in the pivot joint 1 and is movable to be selectively positioned around the circumference of the shaft 11. In this respect, a lower edge region of the first collar 40 is provided with a series of generally U-shaped recesses 42 that open in a downward direction and are spaced apart at regular angular intervals of about 30° around the circumference of the collar 40. These U-shaped recesses 42 are designed to receive a correspondingly sized pin-like projection 16 which extends or projects radially outwardly from the shaft 11. In this embodiment, two diametrically opposed pin-like projections 16 are provided in or on the first joint member 10 for receipt and engagement in two oppositely located U-shaped recesses 42 in the first collar 40 of the stop mechanism 30. In this way, the recesses 42 and the projecting pins 16 cooperate to form a first detent mechanism for registered interconnection of the first collar 40 with the shaft 11 to fix the first collar 40 (and thereby the first stop 41) selectively at any one of a plurality of positions against rotation about the central axis 13 relative to the shaft. By moving the first collar 40 axially along the shaft 11 away from the lower bearing 15, i.e. by lifting or sliding the collar 40 vertically along the shaft, the first collar 40 becomes disengaged from the projecting pins 16 in the respective U-shaped recess 42 such that it can be rotated relative to the shaft 11 in increments of 30° between the positions of registered interconnection provided by each of the recesses 42 in this first detent mechanism.

The second collar 50 of the adjustable stop mechanism 30 sits or rests upon the first collar 40. As is particularly clear from FIGS. 2 and 3 of the drawings, a free upper end of the rectangular abutment member of the first stop 41 engages a lower edge of the second collar 50. Similarly, a free lower end of the rectangular abutment member of the second stop 51 is configured to engage in any one of a series of corresponding rectangular notches 43 formed in the upper edge region of the first collar 40. In this way, the second collar 50 (and thereby the second stop 51) is also configured to be selectively positioned relative to the shaft 11 and, more particularly relative to the first collar 40 and first stop 41 of the stop mechanism. In particular, the notches 43 cooperate with the end of the second stop 51 to form a second detent mechanism which provides registered positioning of the second collar 50 on the first collar 40, and which thereby selectively fixes the second stop 51 against rotation about the central axis 13 relative to the first collar 40 at any one of a plurality of positions defined by the notches 43. That is, the rectangular end of the abutment member of the second stop 51 forms a registration member for positioning the second collar 50. In this regard, it will be noted that the notches 43 in this case are also regularly spaced at angular intervals of about 30°, but may be offset (e.g. by 15°) from the recesses 42 formed in the lower edge region of the first collar 40. The ends of the first and second stops 41, 51 which respectively engage the lower and upper edges of the second and the first collars 50, 40 serve to maintain the collars 40, 50 in an axially spaced apart relationship, so that they define a space or slot S there-between, with that slot or space S extending circumferentially around the shaft 11.

With reference again to drawing FIG. 1, the second joint member 20 can be seen to include an engagement member 22 which projects radially inwardly from the sleeve 21. This engagement member 22 may, for example, comprise a stud or screw which is received and securely held within a threaded hole 23 in the sleeve 21 such that it projects inwardly into the stop mechanism 30. The stud or screw-like engagement member 22 is thus arranged to extend into the space or slot S between the first and second collars 40, 50. As a result, the inner end of the stud or screw is adapted to engage or come into abutment with each of the first and second stops 41, 51 at each respective limit of rotation of the second joint member 20 relative to the shaft 11. In other words, a lateral surface 44, 54 of each of the rectangular abutment members forming the first and second stops 41, 51 blocks or prevents further rotation of the sleeve 21 relative to the shaft 11 through contact with the engagement member 22. As such, the slot formed between the first and second collars 40, 50 which extends circumferentially around the shaft 11 between the first and second stops 41, 51 actually defines the range of rotation of the second joint member 20 relative to the first joint member 10, and the stops 41, 51 define the end-points or the limits of that rotation.

Although the engagement member 22 is actually connected to the sleeve 21 (as seen in FIG. 1) and thus forms part of the second joint member 20, that stud or screw 22 has nevertheless been shown in FIGS. 2 and 3 to illustrate its spatial and functional relationship with respect to the first and second collars 40, 50 and to the first and second stops 41, 51.

Also shown in FIGS. 2 and 3 located above the stud or screw 22 is a plug or grommet 24 which is also provided in a hole or port 25 of the sleeve 21 of the second joint member, as can be clearly seen in FIG. 1. That hole or port 25 is designed for a user to access the stop mechanism 30 from the outside of the sleeve 21 in order to adjust the position of the second stop 51. In particular, by removing the plug 24, a user may insert a tool (such as the tip of a screw-driver) through the access port 25 to engage a thin circumferential groove 53 formed in a periphery of the second collar 50. By applying an upward force to the tool, the lower end of the second stop 51 can be lifted out of its engagement with the rectangular notches 43 to free the second collar 50 for rotation relative to the first collar 50, which itself is rotationally fixed relative to the shaft 11 via the recesses 42 and projection pins 16 of the first detent mechanism. In this way, the position of the second stop 51 can be adjusted relative to the first stop 41.

Similarly, although not visible in the drawing figures, another access port is provided in the sleeve 21 of the second joint member 20 at a lower level for inserting the tool to access a corresponding thin circumferential groove 45 formed in the first collar 40. Before adjusting the position of the first collar 40, however, it is firstly necessary to remove the stud or screw 22 from the sleeve 21, as it would otherwise prevent the first collar 40 from being lifted out of engagement with the pins 16 on the shaft 11. In a corresponding manner, then, the first collar 40 (together with the second collar 50 which rests on it) can be lifted or raised with the tool to release the recesses 42 in the lower edge region from their engagement with the projecting pins 16 in order to rotate the first collar 40 (and, thus also the second collar 50) relative to the shaft 11. By rotating the sleeve 21 (i.e. the support member S) on the shaft 11 while engaging and lifting the first collar 40 with the tool, the collar 40 will also be carried around the shaft. In this way, the position of the first stop 41 can be adjusted relative to both the shaft 11 and to the frame of reference—i.e. the building or the space within which the mounting arm A is installed.

Considering the settings of the first and second stops 41, 51 shown in FIG. 2, for example, it will be seen that the pivot joint 1 provides a range of about 90° angular rotation between the first stop 41 and the second stop 51. Thus, such a setting may be desirable if the mounting arm A is provided e.g. in a corner of a room offering only limited space for movement. In such a case, the stop mechanism 30 of the joint can be adjusted to ensure that the support arm S and/or the equipment mounted on an end thereof does not make contact with walls of the room in that corner. The settings of the first and second stops 41, 51 shown in FIG. 3, on the other hand, do not provide for any movement whatsoever of the second joint member 20 relative to the first joint member 10. As such, it represents a setting suitable for transport of the mounting arm A in which all pivoting/swivelling movement of the joint 1 is blocked.

When the mounting arm A with the rotatable joint 1 of the invention is first installed, the transport setting is released by removing the abutment member 22 (i.e. the stud or screw) from the sleeve 21 and then accessing the groove 45 in the first collar 40 through the access port (not shown) to lift and adjust the position of the first stop 41 relative to the shaft 11 and relative to the space in which the mounting arm A is installed. The position of the first stop 41 can be confirmed visually, and/or via the tool, through the threaded hole 23 of the stud or screw abutment member 22. After the position of the first stop 41 has been selectively set, the second stop 51 can be adjusted relative to the first stop 41 via a tool inserted through the upper access port, as described above. By setting the position of the second stop 51 relative to the first stop 41, the end points or limits, and thus the range, of rotational movement in the slot S are then set for the pivot joint 1. If it is unlikely one will later wish to modify these settings, one or more setting fastener 55 (e.g. screw) provided through holes 52 through the second collar 50 can be used to fix the second collar 50 axially and non-rotatably to the shaft 11 to prevent any unwanted movement or changes to the settings.

Although not illustrated in the drawing figures, it will be appreciated that the second stop 51 may be selectively positioned by a user directly adjacent to the first stop 41. Such a configuration of the stop mechanism 30 then provides for a maximum range of rotation of the joint 1 and mounting arm A over approx. 330° between the first and second stops 41, 51.

In a simplified embodiment of the invention, a joint 1 and a mounting arm A may be provided with an adjustable stop mechanism 30 according to the invention having a first part or first collar 40 without the second part or second collar 50. In such an embodiment, the first stop 41 may then define both of the end-points or limits of the relative rotational movement of the second joint member 20 and the support member S with respect to the first joint member 10. That is, the opposite lateral or side surfaces 44 of the rectangular abutment member forming the first stop 41 will abut or come into engagement with the stud-like engagement member 22 in the sleeve 21 at each end of the rotational range of movement. In a further modification, the first part or collar 40 may include two first stops 41 spaced apart at a fixed interval. As such, the two first stops 41 may define one range of angular rotation on one circumferential side there-between (e.g. 120°) and another range of angular rotation on the other circumferential direction there-between (e.g. 240°). As the skilled person will appreciate, however, such embodiments without a second collar 50 provide a significantly lower degree of flexibility for the user to set and adjust the desired range and end-points of the joint rotation.

It will be appreciated that the above description of the preferred embodiments of the invention with reference to the drawings has been made by way of example only. Thus, a person skilled in the art will appreciate that various changes, modifications and/or additions may be made to the parts particularly described and illustrated without departing from the scope of the invention as defined in the claims. For example, although the shaft or column 11 of the first joint member 10 and the surrounding sleeve or collar 21 of the second joint member 20 have been shown in the drawings in a substantially vertical orientation, it will be apparent to a skilled person that the principles of the present invention may be applied with appropriate adaptation to other spatial orientations of the joint 1.

The invention claimed is:

1. A rotatable joint comprising:
a first joint member for connection to a reference frame;
a second joint member connected with the first joint member and configured for rotation relative to the first joint member about an axis while connected with the first joint member; and
an adjustable stop mechanism defining first and second limits of rotation of the second joint member relative to the first joint member, the stop mechanism comprising:
a first part provided on the first joint member having at least a first stop defining at least the first limit of rotation of the second joint member about said axis relative to the first joint member, wherein the first part is configured to be selectively positioned with respect to the first joint member to define the first limit of rotation of the second joint member relative to the first joint member, wherein the first part of the adjustable stop mechanism is configured to be rotatable around a circumference or a periphery of the first joint member, wherein the first part has means for registered interconnection with the first joint member to fix the first stop against rotation about said axis relative to the first joint member at any of a plurality of positions by axial engagement with the first joint member, and wherein the means for registered interconnection comprises a first detent mechanism and includes one or more recesses or projections formed in or on the first part for receipt of, or engagement with, one or more complementary projections or recesses on or in the first joint member in an axial direction.

2. A rotatable joint according to claim 1, wherein the first part of the adjustable stop mechanism is adapted to be selectively moved and positioned around the axis, and preferably around a circumference of the first joint member.

3. A rotatable joint according to claim 1, wherein the first part of the adjustable stop mechanism is adapted to be rotated around the axis, and preferably around a circumference or periphery of the first joint member.

4. A rotatable joint according to claim 1, wherein the first detent mechanism comprises a plurality of the recesses or projections arranged spaced from one another at regular intervals around a circumference or periphery of the first part and/or of the first joint member.

5. A rotatable joint according to claim 1, wherein the first joint member is configured as a shaft or column and the second joint member is configured as a sleeve or collar which extends around the first joint member, and wherein the adjustable stop mechanism is arranged between the first joint member and the second joint member, the first part of the stop mechanism preferably being substantially ring-shaped such that it extends around the shaft or column of the first joint member.

6. A rotatable joint comprising:
a first joint member for connection to a reference frame;
a second joint member connected with the first joint member and configured for rotation relative to the first joint member about an axis while connected with the first joint member; and
an adjustable stop mechanism defining first and second limits of rotation of the second joint member relative to the first joint member, the stop mechanism comprising:
a first part provided on the first joint member having at least a first stop defining at least the first limit of rotation of the second joint member about said axis relative to the first joint member; and
a second part provided on the first part and having a second stop defining a second limit of rotation of the second joint member about said axis relative to the first joint member, wherein the second part is adapted to be selectively positioned with respect to the first part to define a range of rotation of the second joint member relative to the first joint member between the first stop and the second stop,
wherein the first part is configured to be selectively positioned with respect to the first joint member to define the first limit of rotation of the second joint member relative to the first joint member, and wherein the first part of the adjustable stop mechanism is configured to be rotatable around a circumference or a periphery of the first joint member.

7. A rotatable joint according to claim 6, wherein the first part is configured to be selectively positioned to locate the first stop with respect to the first joint member, and wherein the second part is configured to be selectively positioned on the first part to locate the second stop with respect to the first stop.

8. A rotatable joint according to claim 6, wherein the stop mechanism includes means for registered positioning of the second part on the first part to fix the second stop against rotation about said axis relative to the first part at any one of a plurality of positions.

9. A rotatable joint according to claim 8, wherein means for registered positioning comprises a second detent mechanism and includes a plurality of recesses or projections formed in the first part for receipt of, or engagement with, a registration member formed in the second part.

10. A rotatable joint according to claim 6, wherein the second part of the adjustable stop mechanism is adapted to be selectively moved and/or positioned around the axis, and preferably around a circumference or periphery of the first joint member.

11. A rotatable joint according to claim 6, wherein the second part of the adjustable stop mechanism is adapted to be rotated around the axis, and preferably around a circumference of the first joint member.

12. A rotatable joint according to claim 6, wherein the first stop comprises an abutment member which is positioned in a path of the second joint member to block or prevent rotation thereof relative to the first joint member; and/or
wherein the second stop comprises an abutment member which is positioned in a path of the second joint member to block or prevent rotation thereof relative to the first joint member.

13. A rotatable joint according to claim 6, wherein the second joint member comprises an engagement member which travels a path between each of the first and second stops during rotation of the second joint member relative to the first joint member, and which engages or comes into abutment with a respective stop at each limit of the relative rotation.

14. A rotatable joint according to claim 13, wherein the second joint member is connected substantially coaxially with the first joint member, and wherein the engagement member projects radially from the second joint member, preferably radially inwardly, to engage or come into abutment with each of the stops at the respective limits of its rotation relative to the first joint member.

15. A device for supporting technical equipment, e.g. in a hospital or in a commercial or an industrial environment, comprising:
a mounting arm including a rotatable joint according claim 1.

16. An adjustable stop mechanism for a rotatable joint having a first joint member and a second joint member, the second joint member being connected to the first joint member for rotation relative thereto about an axis, the stop mechanism comprising:
a first part provided on the first joint member and having a first stop defining a first limit of relative rotation of the second joint member about said axis; and
a second part provided on the first part and having a second stop defining a second limit of relative rotation of the second joint member about said axis;
wherein the first and second parts are configured to be moved around the axis and selectively positioned with respect to the first joint member and with respect to one another while the first and second joint members are connected, to define the first and second limits of relative rotation, respectively, wherein the first and second limits of relative rotation limit a range of rotation of the second joint member relative to the first joint member between the first stop and the second stop, wherein the first part of the adjustable stop mechanism is configured to be rotatable around a circumference or a periphery of the first joint member.

* * * * *